Aug. 4, 1936.  E. A. M. FLIESBERG  2,049,696
TRANSMISSION GEAR
Filed March 28, 1935  3 Sheets-Sheet 3

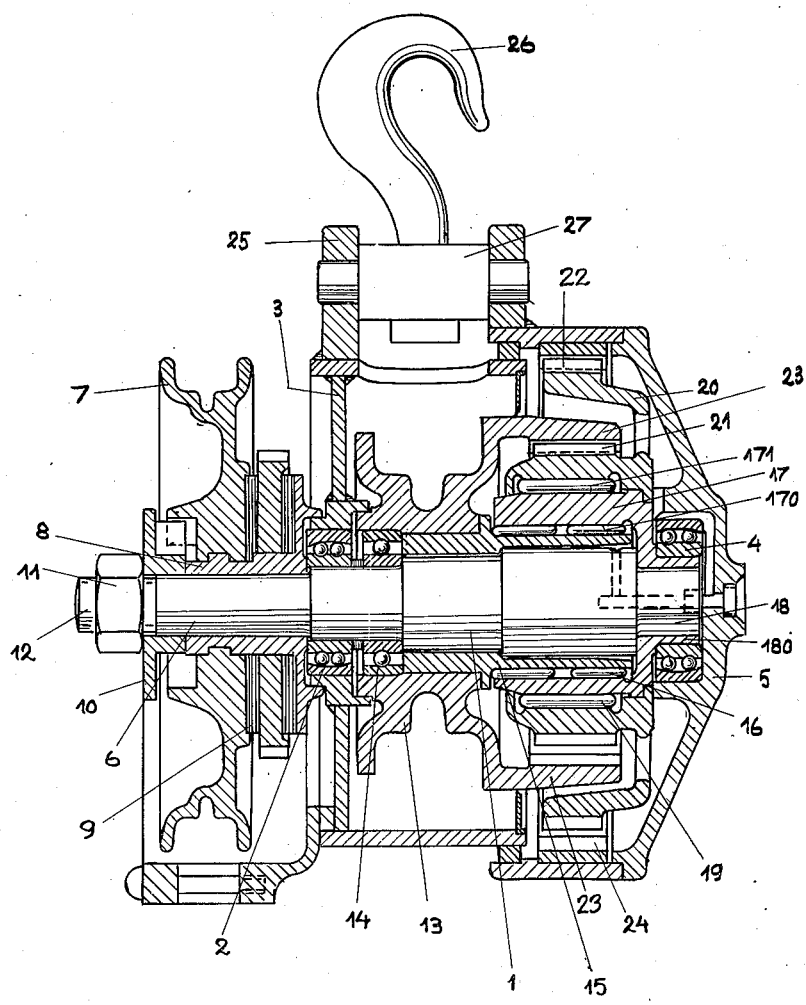

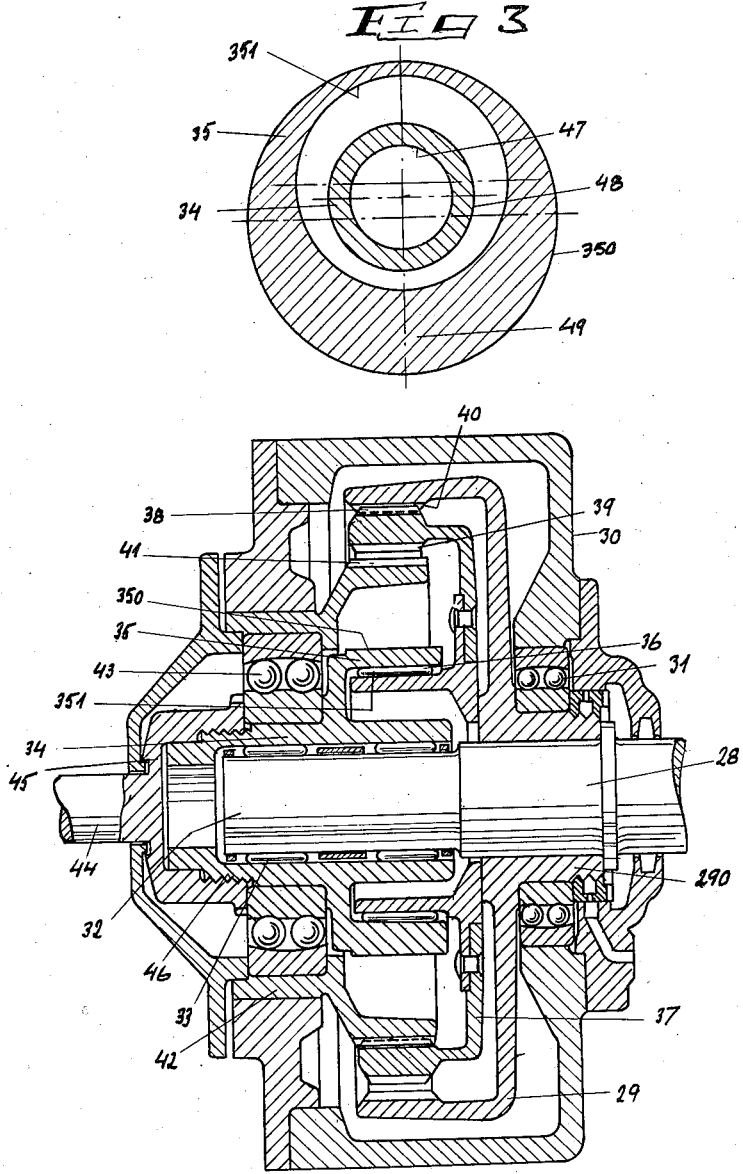

E. A. M. Fliesberg
Inventor
By Glascock Downing & Seebold
Attys.

Patented Aug. 4, 1936

2,049,696

UNITED STATES PATENT OFFICE 2,049,696

TRANSMISSION GEAR

Erhard A. M. Fliesberg, Appelviken, Stockholm, Sweden

Application March 28, 1935, Serial No. 13,566
In Sweden March 7, 1935

8 Claims. (Cl. 74—309)

This invention principally relates to such transmission gears which transfer the motive power from a driving member on to a driven member with a comparatively slow speed as is the case in for instance pulley blocks or other hoisting apparatuses. Under certain conditions, however, this invention can be successfully utilized for transferring of a considerable revolving speed for which purposes it suffices that some of the details be designed otherwise than for slow speed without interfering with the material features of the invention. As such modifications must suit the special conditions from case to case it will be too spacious to demonstrate or describe them all, hence this invention will be described below with reference to the accompanying drawings only which have for their sole object to show as examples how the invention can be materialized, and I do not wish to limit myself to exclusively the embodiments thus illustrated.

The main object of this invention is to provide a much constricted transmission gear which will allow heavy loads with rather small sizes.

Another object of this invention is a transmission gear, the various parts of which are supported very rigidly so as to avoid tilting effects on the bearings and journals.

A further object of my invention is a gear which combines large power with small dead weight and reduced wear and tear.

With these and other objects in view this invention is referred especially to such transmission gears in which motive power gets transferred from a driving member on to a driven member coaxial therewith by means of an eccentric that is combined with the driving member and supports a rotary gear wheel with at least two toothed rims the one of which rims cooperates with a stationary toothed wheel coaxial with the driving member and the driven member, while another of said toothed rims cooperates with a toothed wheel which is rigidly secured to the driven member coaxial thereto. Of the toothed wheels and rims mentioned, those having a larger diameter encircle like bowls those wheels or rims which have a less diameter so that the radial middle planes of all said wheels or rims substantially coincide, while either the driving member or the driven member is journalled on each side of the gear in a bearing supported directly by the framing or the casing of the gear. That individual of said two members which is not journalled in the aforesaid bearings is supported by the member and journalled in such a way that all the wheels and shafts of the gear in reality are supported by the framing or casing by means of those aforesaid side bearings which are supported directly by the framing or casing of the gear.

The advantage of this mode of supporting the wheels and shafts in the gear lies especially therein, that it facilitates considerably the construction of the gear, since it will be necessary to centre those two bearings only which support directly the one member by the framing or casing, while the bearings for the other member will be automatically centred together with the aforesaid two bearings, because the axis of the two first mentioned bearings coincides with the axis of the two last mentioned bearings, and as a consequence will be adjusted therewith in contradiction to similar gears of hitherto known types wherein the driving member is supported by two or more bearings which are wholly independent of the bearings which support the driven member. This new design will make the construction much cheaper as also more exact and free from sources of defects as well as more durable.

In the annexed drawings some embodiments of this invention are illustrated, wherein Figure 1 is a sectional elevational view through a pulley block with a gear in accordance with this invention;

Figure 2 is a similar sectional view through a transmission gear of the same general type;

Figure 3 is a cross section through a detail of the gear shown in Figure 2;

Figure 4:
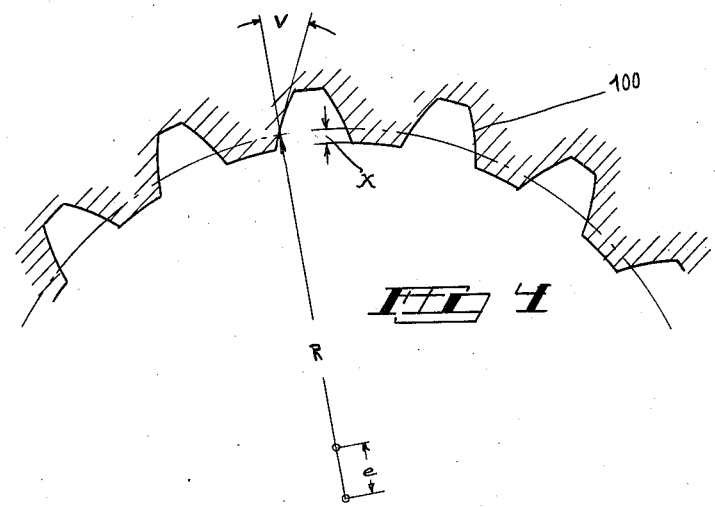
Figure 4 shows a portion of a toothed rim with internal teeth to suit a gear in accordance with this invention.

Referring to Figure 1, the driving shaft of the pulley block is designated by 1, and at the one end it is carried by a self-adjusting ball bearing 2 mounted in the left hand side wall 3 of the block casing, while the opposite end of shaft 1 is supported by another self-adjusting ball bearing 4 mounted in the right hand side wall 5 of the block casing. Outside the left hand side wall 3 the reduced end portion 6 of shaft 1 carries a hand chain wheel 7 by means of a sleeve 8 with a frictional clutch 9. The sleeve 8 is secured to the shaft end 6 by a clutch shaped bracket 10 and a nut 11 on the screw threaded shaft end 12.

Within the casing the load chain wheel 13 is mounted on the shaft 1 by means of a ball bearing 14 at the left hand side of the wheel and of a sleeve 15 at the right hand side which sleeve projects considerably to the side of the wheel and is supported by a needle bearing 16 on the internal cylindrical surface 170 of a sleeve 17, said surface being coaxial to the shaft 1, but does not touch said shaft. At its right hand end the sleeve 17 is secured to the reduced end 18 of the shaft 1 so that the neck 180 of the sleeve 17 transfers the support of ball bearing 4 on to the shaft 1. The external cylindrical surface 171 of the sleeve 17 is eccentric to the shaft 1 and supports by means of a needle bearing 19 a freely revolving gear wheel 20 having two coaxial toothed rims 21, 22, the internal one 21 of which rims cooperates with a toothed rim 23 coaxial to the shaft 1 and integrally with or rigidly secured to the load chain wheel 13, while the external toothed rim 22 of the wheel 20 cooperates with a stationary toothed rim 24 coaxial to the shaft 1 and rigidly secured to the casing.

The pulley block is provided as usual with a suspension hook 26 by means of a cross piece 27 hinged in lugs 25 in the casing.

In Figure 2 the driven shaft of the gear is designated with 28 and carries rigidly a gear wheel 29 with internal teeth. At its right hand end the shaft 28 is supported by the casing 30 in a self-adjustable ball bearing 31 which supports the shaft directly notwithstanding the interposition of the extended hub 290 of wheel 29 which hub closely fits the shaft 28. The reduced left hand end 32 of shaft 28 supports by means of a needle bearing 33 a sleeve 34 the right hand portion of which is encircled by an external sleeve 35 made integral with the hublike sleeve 34, but which as well can be made separate and removably attached to sleeve 34. The external cylindrical surface 350 of the outer sleeve 35 is coaxial to the shaft 28, while the internal cylindrical surface 351 of the same sleeve is eccentric to said shaft and supports by means by a needle bearing 36 a gear wheel 37, freely rotatable around said surface 351, and having two toothed rims 38 and 39 coaxial to each other and eccentric to shaft 28. The external toothed rim 38 cooperates with the internal teeth of the gear wheel 29, while the internal toothed rim 39 cooperates with the external teeth 41 of an annular wheel 42 that is stationary secured in the casing 30. The sleeve 34 is supported by the casing 30 by means of a self-adjusting ball bearing 43.

The driving shaft 44 of the gear, which is coaxial to the driven shaft 28, at its end within the casing 30 is shaped as a sleeve 45 the internal cylindrical surface of which is provided with screw threads 46 coacting with screw threads on the external surface of the sleeve 34 securing said last mentioned sleeve in a removable way to the shaft 44. As a consequence of this supporting device the right hand end of the driving shaft 44 is supported directly by the casing 30 by means of the ball bearing 43, and the right hand end of the driven shaft 28 as well is supported directly by the same casing 30 by means of the ball bearing 31, while the left hand end of the last mentioned shaft is supported indirectly in the casing 30 by the bearing 43, the sleeve 34 and the driving shaft 44. As a result, however, it is the two ball bearings 31, 43, which are mounted in the casing 30, which are the prime supports for the driving shaft as well as for the driven shaft, and as a consequence, the centering of these two bearings alone is responsible for the due operation of the whole gear.

In Figure 3, the internal cylindrical surface 47 of the sleeve 34 as also the external cylindrical surface 48 of same sleeve are indicated, and they are clearly shown to be concentric. The internal cylindrical surface 351 of the outer sleeve 35 as well as the external cylindrical surface 350 of the same sleeve are shown eccentric to each other as also to the two aforesaid cylindrical surfaces 47, 48 of the inner sleeve 34. By that, a portion 49 of sleeve 35, having an increased thickness, is located in such a position relatively to the internal surface 351 that a counterweight to the eccentrically supported wheel 37 is created.

The present invention utilizes the properties of this type of gear in the most perfect way, inter alia, by that, that the difference in the number of teeth in cooperating gear wheels can be reduced to the least possible amount or to one so that the gear ratio will be kept within very wide limits. However, experience has shown that it is not possible to use such small differences in the number of teeth as long as in a gear with internal teeth the profile of the teeth is conventional, because then the heads of the teeth in the one wheel are exposed to wear against the heads of the teeth in the other wheel. In accordance with this invention said profiles of the teeth therefor are characterized by a small height in comparison to the peripherical width as is evident from Figures 4 and 5.

Figure 5:
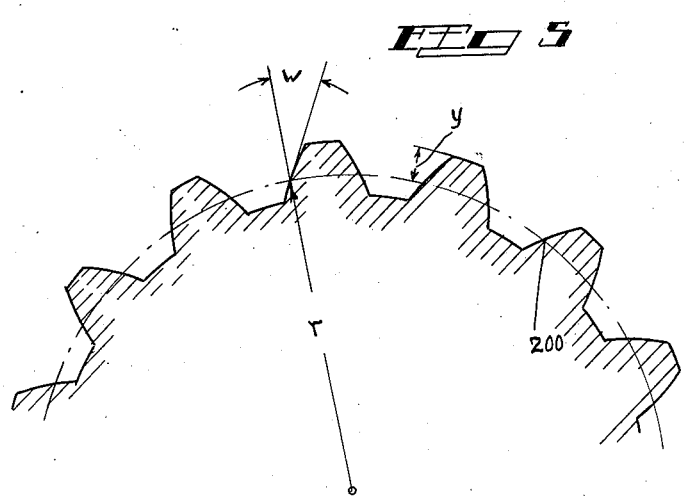
Figure 5 shows a similar portion of a toothed rim with external teeth provided to cooperate with the toothed rim in Figure 4.

In Figure 4, a diagrammatically shown toothed rim 100 is provided with internal teeth, the height of the heads of which is designated by $x$, while the radius of the pitch circle is of the length R, and the meshing angle between coacting teeth has the size $v$ degrees. In Figure 5 the diagram of the cooperating toothed rim 200 is shown, having the pitch radius $r$, the head of the external teeth $y$ and the meshing angle $w$ degrees. The eccentricity $e$ of the two rims is like the difference between the two pitch radiuses $R-r=e$.

Experience has proven that the difference in number of teeth of two cooperating gear wheels 100 and 200 can be as low as 1 to 4, if the meshing angles $v$ respectively $w$ are not below 24 degrees and not above 35 degrees, whereby the most preferable size will lie between 28 and 32 degrees which is much in excess of the value of 20 degrees which usually is mentioned in the literature as the highest advisable value. In combination with the small difference of 1 to 4 between the number of teeth in the cooperating gear wheels the height $x$ of the head of internal teeth must be less than is the height $y$ of the corresponding external teeth, whereby the most preferable proportion is $x=\frac{1}{2} y$. Further, the sum $x+y$ may not exceed the eccentricity $e=R-r$.

As already said, I do not wish to limit myself to the embodiments of my present invention here described and illustrated, as this invention can be varied in many respects within the scope of the following claims. For instance, the gear wheels can be divided lengthwise in two halves like reflected images, whereby the eccentric also is divided in two halves which ought to be angularly displaced 180 degrees so as to increase the counterbalancing effect of the eccentric wheels.

What I claim is:

1. A transmission gear comprising a rotary driving member and a rotary driven member coaxial thereto, bowl shaped gear wheels, the larger of which enclose the smaller ones, and intermeshing in pairs for rotating said driven member, two of which gear wheels are coaxial to the driving member and the driven member, while the others are eccentric thereto and rotatable around an eccentric operated by the said driving member, the one of said driving and driven members supported directly by the framing of the gear, a sleeve being secured to that of said two members which is nondirectly supported by the framing of the gear, having its bore coaxial to said member and journalled upon the other of said coaxial members, the external surface of said sleeve being eccentric to said two coaxial members and forming a journal bearing for said eccentric gear wheels, and all the coaxial and eccentric gear wheels surrounding said sleeve, having their radial middle planes substantially coinciding to the operative radial middle plane of said sleeve.

2. A transmission gear comprising a rotary driving member and a rotary driven member coaxial thereto, bowl shaped gear wheels, the larger of which enclose the smaller ones, and intermeshing in pairs for rotating said driven member, two of which gear wheels are coaxial to the driving member and the driven member, while the others are eccentric thereto and rotatable around an eccentric operated by the said driving member, the one of said driving and driven members supported directly by the framing of the gear, a sleeve being secured to that of said two members which is nondirectly supported by the framing of the gear, having its bore coaxial to said member and journalled upon the other of said coaxial members, said sleeve surrounded by another sleeve stationarily secured thereto, the internal surface of said outer sleeve being eccentric to said two coaxial members and forming a journal bearing for said eccentric gear wheels, and all the coaxial and eccentric gear wheels surrounding said sleeve, having their radial middle planes substantially coinciding to the operative radial middle plane of said sleeve.

3. A transmission gear comprising a rotary driving member and a rotary driven member coaxial thereto, bowl shaped gear wheels, the larger of which enclose the smaller ones, and intermeshing in pairs for rotating said driven member, two of which gear wheels are coaxial to the driving member and the driven member, while the others are eccentric thereto and rotatable around an eccentric operated by the said driving member, the one of said driving and driven members supported directly by the framing of the gear, a sleeve being secured to that of said two members which is non directly supported by the framing of the gear, having its bore coaxial to said member and journalled upon the other of said coaxial members, said sleeve surrounded by another sleeve stationarily secured thereto, the internal surface of said outer sleeve being eccentric to said two coaxial members and forming a journal bearing for said eccentric gear wheels, and all the coaxial and eccentric gear wheels surrounding said sleeve, having their radial middle planes substantially coinciding to the operative radial middle plane of said sleeve, the external surface of said outer sleeve being eccentric to said internal surface of the same outer sleeve as well as to said two coaxial members, forming a counterweight for the counterbalancing of said eccentric gear wheels.

4. A transmission gear comprising a rotary driving member and a rotary driven member coaxial thereto, bowl shaped gear wheels, the larger of which enclose the smaller ones, and intermeshing in pairs for rotating said driven member, two of which gear wheels are coaxial to the driving member and the driven member, while the others are eccentric thereto and rotatable around an eccentric operated by the said driving member, the one of said driving and driven members supported directly by the framing of the gear in a bearing on each side of the gear, the other of said two members rotatably supported by the directly supported first mentioned member in such a way that all the rotatory members of the gear are supported by the framing by means of solely said two bearings which directly support the first-mentioned member, the meshing angles between cooperating teeth of said eccentric and coaxial gear wheels having a value between 24 and 35 degrees.

5. An eccentric epicyclic gear for transmitting motion from a driving member to a driven member, characterized by the feature that the driving member is journalled in the casing or frame of the gear, and carries the eccentric member for the gear train, which eccentric has a bore concentric with the axis of said member, the driven member being journalled in the said bore of the eccentric member.

6. An eccentric epicyclic gear as claimed in claim 5 in which that one of said members which carries the eccentric is journalled at each side of the gear train in the casing or frame of the gear, the other of said members being journalled in this member and in said bore of the eccentric member.

7. An eccentric gear as claimed in claim 5, in which that one of said members which carries the eccentric is journalled at each side of the gear train in the casing or frame of the gear, the other of said members being journalled in this member and in said eccentric bore of the eccentric member, and in which the radial middle plane of the journal in the bore of the eccentric member substantially coincides with the radial middle plane or the outer peripheral surface of the eccentric member.

8. An eccentric epicyclic gear as claimed in claim 5 in which the bore of the eccentric member is extended into the member carrying said eccentric so that a journal is provided for the other said member which axially coincides with the journal for the first mentioned member in the casing or frame of the gear.

ERHARD A. M. FLIESBERG.